United States Patent [19]

Cornell

[11] 4,091,617

[45] May 30, 1978

[54] HYDRAULIC CONTROLLER

[75] Inventor: Charles R. Cornell, Battle Creek, Mich.

[73] Assignee: Eaton Corporation, Cleveland, Ohio

[21] Appl. No.: 795,689

[22] Filed: May 11, 1977

[51] Int. Cl.² ............................................. F16H 39/46
[52] U.S. Cl. ........................................ 60/445; 60/465; 60/DIG.2
[58] Field of Search ............ 60/445, 451, 465, DIG. 2

[56] References Cited

U.S. PATENT DOCUMENTS

| 3,864,915 | 2/1975 | Metailler | 60/DIG. 2 |
|---|---|---|---|
| 3,924,410 | 12/1975 | Cornell et al. | 60/445 |

Primary Examiner—Edgar W. Geoghegan
Attorney, Agent, or Firm—R. J. McCloskey; L. J. Kasper

[57] ABSTRACT

An electro-hydraulic control for a hydrostatic transmission including a variable displacement hydraulic pump and fluid operable servos to vary the displacement of the pump. The electro-hydraulic control is in series between the charge pump and the standard manual controller and determines the maximum pressure of the charge fluid ported to the standard controller. The electro-hydraulic control includes a spool biased toward a first position to port fluid from the charge pump to the standard controller, and biased toward a second position to relieve to tank the pressure of fluid ported to the manual controller. The biasing toward the second direction is accomplished, in part, by pressure in a fluid chamber exerting a biasing force on the spool, the fluid chamber being in communication with drain through a variable orifice which is variable in response to a pressure command signal. This signal is generated by control logic including a torque command signal generator which is variable to correspond to a maximum desired input torque setting and circuitry providing a torque approximation signal representing the product of pump displacement and the instantaneous pressure command signal. The circuitry compares the torque command and torque approximation signals and generates a new pressure command signal tending to minimize the difference between the torque command and approximation signals. As a result, the commanded maximum system pressure varies such that the product of maximum system pressure and pump displacement (equal to input torque) is constant, for a given input torque setting.

17 Claims, 6 Drawing Figures

HYDRAULIC CONTROLLER

BACKGROUND OF THE DISCLOSURE

The present invention relates to an electro-hydraulic control for varying the control pressure to a standard controller used to port fluid to the servos of a variable displacement pump or motor.

It is common in designing controls for hydrostatic transmissions to design a distinct control for each desired function. For example, a pressure override (P.O.R.) control is designed to monitor the system pressure of a transmission to protect the transmission from extending excessive overloads. P.O.R. controls are well known in the art and will be disclosed, in part, in the present application. An anti-stall control is used to destroke the swashplate of a pump in response to loading of the prime mover of the pump. Anti-stall controls generally make use of governors (see U.S. Pat. Nos. 2,516,662 and 2,976,685) to directly control movement of the valve spool and thereby control fluid pressure. Another type of control is a phasing control which is used to first increase the displacement of the pump swashplate in a hydrostatic transmission to its maximum and then decrease the displacement of the motor swashplate to a minimum to achieve an increase in speed of the transmission, and to reverse the process for a decrease in speed. Phasing controls generally make use of cams (see U.S. Pat. No. 2,516,662).

Yet a further control is an input torque limiter (I.T.L.) control which matches the torque of a hydrostatic transmission to that of the prime mover. I.T.L. controls generally make use of cams to reset the compensating override pressure for each swashplate position to maintain constant the product of system pressure and pump displacement. Other known I.T.L. controls are hydraulic wherein a pressure drop across a compensating or override spool is maintained proportional to the pump displacement. This is generally accomplished by a variable orifice. Further, other known I.T.L. controls are electrical. In the electrical I.T.L. controls the displacement of the pump and the system pressure are each measured and then multipled to produce a signal which is then used to control the displacement of the pump. All of the electrical I.T.L. controls of which applicant is aware make use of a pressure transducer.

Although each of the preceding referenced controls perform their respective functions generally satisfactorily, they are relatively cumbersome, complicated, difficult to adjust, and expensive. Further, a separate, distinct control exists for each of the functions. Generally, the parts of each of the controls cannot be interchanged with parts from another control.

Accordingly, it is an object of the present invention to provide a simple, inexpensive control which may be readily adapted to perform a number of functions in controlling the operation of a variable displacement pump, a variable displacement motor, or a hydrostatic transmission including a pump and motor combination.

It is a further object of the present invention to provide a basic component which may be simply and easily adapted to control any one of a number of functions of either a hydrostatic transmission or the pump or motor of the transmission.

In many of the electrical controls of the type discussed above, it is desirable to generate a command signal which is a quotient resulting from the division of one system characteristic by another, wherein either the dividend or the divisor may be a manually selected input, or may be a variable system characteristic. For example, in the electro-hydraulic I.T.L. control disclosed hereinafter, the system logic generates a variable pressure command signal corresponding to maximum system pressure for any given displacement. Mathematically, this pressure command signal is obtained by dividing the maximum input torque (a manual setting) by the pump displacement (a variable system characteristic).

Known electro-hydraulic controls have accomplished necessary division functions in generally one of two ways: either the quotient is approximated, using a linear approximation (or a series of linear approximations), or the quotient is actually calculated by means of an analog divider. The linear approximation method results in relatively poor performance, while the analog division method is excessively expensive for application in hydrostatic transmission controls.

Accordingly, it is another object of the present invention to provide an electro-hydraulic control including a simple, inexpensive method of calculating a "quotient" which is then used by the control as a command signal.

SUMMARY OF THE INVENTION

The above and other objects of the invention are accomplished by the provision of a control system for a variable displacement hydraulic device, such as a pump or motor, having fluid operable means for varying the displacement thereof and a source of pressurized fluid for operating the fluid operable means. The control system comprises a housing defining a valve bore, an inlet fluid port, a control fluid port and a drain fluid port, the ports being in fluid communication with the valve bore. A valve is disposed in the valve bore and is movable between a first position permitting fluid communication between the inlet port and the control port, and a second position permitting fluid communication between the control port and the drain port. The valve is biased toward the first position by a first biasing means and toward the second position by a second biasing means. One of the biasing means includes means for generating a variable electrical command signal X, representative of a first characteristic of the device (such as maximum system pressure), and means responsive to the command signal X to provide a variable biasing force, the variable biasing force being related to the variable command signal X in a known manner. The means for generating the command signal X includes a setting command signal generator which is variable to correspond to a desired input setting Y representative of a second characteristic of the device (such as maximum pump input torque). The command signal generating means also includes means providing a setting approximation signal Y' proportional to the product of a third characteristic Z of the device (such as pump displacement) and the instantaneous variable command signal X, wherein the characteristics X, Y, and Z of the device are related by the equation: $X = Y/Z$. The system also includes means for comparing the input setting Y and the setting approximation signal Y' and continually generating a new command signal X tending to minimize the difference between the input setting Y and the setting approximation signal Y'.

DESCRIPTION OF THE PREFERRED EMBODIMENTS

Figure 1:
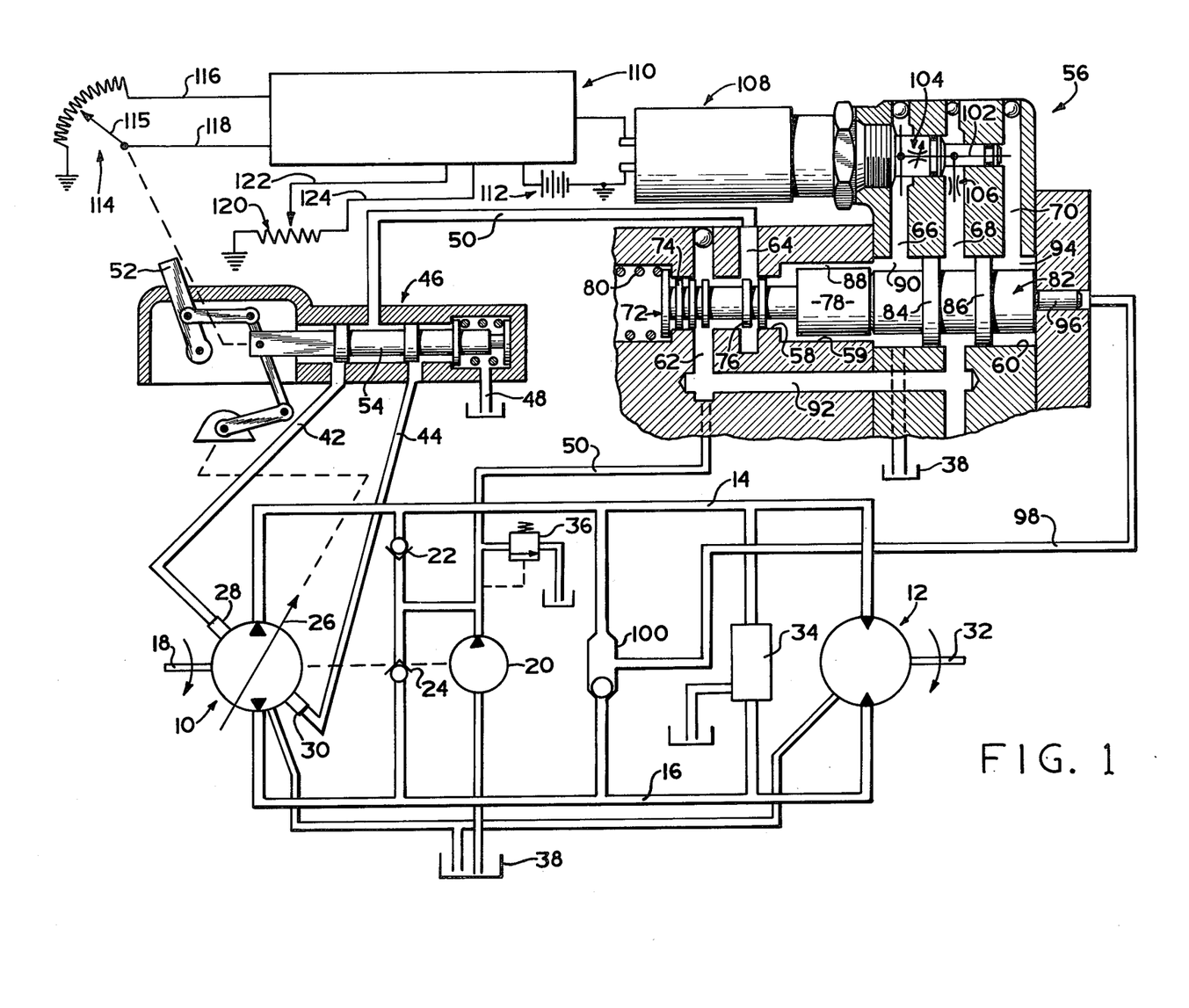
FIG. 1 is a partly schematic, partly cross section illustration of a hydrostatic transmission control system incorporating an electro-hydraulic control made in accordance with the present invention.

The hydrostatic transmission of FIG. 1 includes a variable displacement swashplate axial piston pump 10 hydraulically coupled to a fixed displacement motor 12 via conduits 14 and 16. Pump 10 is a well known type and includes an input shaft 18 which is used to drive the rotating group of the pump and also drive a charge pump 20 hydraulically coupled via check valves 22 and 24, respectively, to conduits 14 and 16. Pump 10 further includes a swashplate 26 which is movable over-center by a pair of known stroking cylinders 28 and 30. Motor 12 includes an output shaft 32. Hydraulically coupled in parallel with motor 12 is a known control mechanism 34 which includes a shuttle valve, a high pressure relief valve and a charge pressure relief valve. A charge pump relief valve 36 is hydraulically coupled to the output of charge pump 20. Pump 10, motor 12, and charge pump 20 are all in hydraulic communication with a reservoir 38.

Strokers 28 and 30 are hydraulically coupled via conduits 42 and 44 to a manual servo control valve 46. Conduit 48 communicates the spring chamber of control valve 46 with the reservoir. Another conduit 50 communicates the bore of control valve 46 with the charge pump as is well known in the art. Control valve 46 includes a control lever 52 and linkage connecting the control valve spool 54 with swashplate 26 to center spool 54 when the position of the swashplate matches the desired position set by control lever 52.

All of the preceding elements are well known in the art of hydrostatic transmission controls. Accordingly, a further description of the operation of these elements does not appear to be warranted. The remaining portion of the specification will therefore be directed toward a description of an electro-hydraulic control 56 and its operation with the previously described portions of the hydrostatic transmission.

Electro-hydraulic control 56 includes a housing defining a multi-stepped bore 58, 59, and 60. A pair of axially spaced passages 62 and 64 intersect bore 58 and a plurality of axially spaced passages 66, 68, and 70 intersect and/or communicate with bore 60. Passage 62 receives pressurized fluid from the charge pump 20 through the upstream portion of conduit 50, while passage 64 communicates with the control valve 46 through the downstream portion of the conduit 50.

Disposed within bores 58 and 59 is a valve spool 72 including a plurality of lands 74, a pair of lands 76 and a single land 78. The lands 74 prevent fluid from flowing from bore 58 into the chamber which houses an adjustable spring 80, which biases spool valve 72 toward the position shown in FIG. 1, permitting fluid to flow from passage 62 to passage 64. Disposed within the bore 60 is a spool valve 82 including a pair of lands 84 and 86. In all operating positions of the valve spool 82, the land 84 separates passage 66 from passage 68 and land 86 separates passage 68 from passage 70.

The bore 59 and land 78 cooperate to define a passage 88 through which fluid may flow from passage 64 (when valve spool 72 is biased to the left of the position shown in FIG. 1). Fluid from passage 88 enters a chamber 90 which is in fluid communication with drain 38. Passage 68 is in communication with passage 62 through an axial passage 92 and therefore, contains fluid at charge pump pressure. The land 86 and bore 60 cooperate to define a fluid chamber 94, the fluid pressure in which is effective to bias valve spool 82 and valve spool 72 to the left in FIG. 1.

Electro-hydraulic control 56 further includes a roller needle 96 having one end in contact with the right end of valve spool 82 and the other end hydraulically coupled by means of a conduit 98 and a shuttle valve 100 to whichever of the conduits 14 or 16 contains high pressure fluid (system pressure). Accordingly, the leftward force exerted by roller needle 96 on valve spool 82 will be directly proportional to system pressure which, in most cases, will be the pressure of fluid flowing from the pump 10 to motor 12.

The remaining portion of electro-hydraulic control 56 which will now be described is shown somewhat schematically. The passages 66 and 70 are interconnected by a fluid passage 102 which includes a variable orifice 104, while the passage 68 communicates with the fluid passage 102 through a fixed orifice 106. Because passage 68 contains fluid at charge pressure, and passage 66 is at drain pressure, it may be seen that the fluid pressure in passage 70 and chamber 94 will be inversely related to the area of variable orifice 104. The area of variable orifice 104 is controlled by a variable force valve 108 which is illustrated as a standard proportional pressure controller of the type sold commercially by Fema Corporation of Portage, Mich. The fluid passage 102, variable orifice 104 and fixed orifice 106 are component parts of the Fema valve. The variable force valve 108 is connected by a pair of leads to an electrical control, generally designated 110 which is in series with a source of power 112. The function of the variable force valve 108 is to receive a command signal from the electrical control 110 and change the variable orifice 104 in response to changes in the command signal such that the fluid pressure in chamber 94 varies in a known manner with changes in the command signal. Preferably, the relationship between the command signal and the fluid pressure in chamber 94 should be linear, i.e., either directly proportional or inversely proportional.

As illustrated, the electro-hydraulic control 56 is being used as an input torque limiter (I.T.L.) to limit the maximum torque required by the prime mover to drive the input shaft 18. The description of the electro-hydraulic control 56 as an input torque limiter is by way of example only and it should be apparent to those skilled in the art that it may be used in a number of other ways to control the operation of a hydrostatic transmission (or a variable displacement pump or motor individually) by providing different electrical controls having different input command signals to the force valve 108.

The electro-hydraulic control 56 operates on the well known hydraulic principle that the product of system pressure and pump displacement is directly proportional to the input torque to the pump. Therefore, by maintaining a constant product of maximum system pressure P and pump displacement D (see FIG. 2), one can provide input torque limiting means.

In the preferred embodiment, this may be accomplished by providing, as electrical inputs to the electrical control 110, the displacement of pump 10 and the maximum desired input torque. In FIG. 1, the pump displacement is provided by means of a swashplate position potentiometer 114 having its wiper 115 mechanically coupled to the linkage of control valve 46, and being connected to electrical control 110 by leads 116 and 118. The maximum input torque may be set manually by means of a linear potentiometer 120 connected to the control 110 by leads 122 and 124. Circuitry within control 110 and associated with potentiometers 114 and 120 will be described in greater detail subsequently.

As the system pressure acting on the needle roller 96 increases and overcomes the force of adjustable spring 80, the pressure of the fluid ported from the charge pump 20 to the manual control valve 46 is reduced. This occurs when valve spools 82 and 72 are moved leftward from the position shown in FIG. 1 to a position in which the lands 76 meter fluid flow between passages 62 and 64 and between passages 64 and 88. As the pressure of fluid ported to manual control valve 46 is reduced, the centering moments of pump 10 and the springs within stroking cylinders 28 and 30 act to decrease the displacement of the pump to a new displacement which, when multiplied by the higher system pressure, maintains the maximum desired input torque. As the displacement is decreasing, however, an electrical signal is being sent by the swashplate position potentiometer 114 to the electrical control 110, reducing the pressure of fluid in chamber 94, which results in a decrease in leftward force on valve spools 82 and 72. The valve spools 72 and 82 are then allowed to move slightly to the right in FIG. 1 and permit a slight increase in the pressure of fluid being ported through the downstream portion of conduit 50 to the manual control valve 46.

In a typical system, the charge pump relief valve 36 may be set to limit charge pump pressure to about 200 psi, and the variable force valve 108 may be selected such that fluid pressure within chamber 94 varies linearly with the pressure command signal (from electrical control 110) from about 10 psi to about 150 psi. The high pressure relief valve in control mechanism 34 is generally set somewhere in the range of 3500 psi to 6000 psi. It is believed that those skilled in the art, having read the foregoing description in conjunction with FIG. 1 can make appropriate modifications in the relative areas of lands 86 and roller needle 96 to achieve a desired torque limiting curve of the type shown in FIG. 2.

Figure 3:
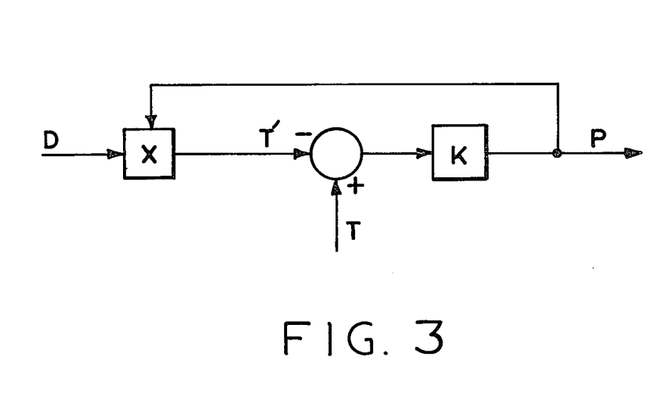
FIG. 3 is a block diagram of the basic circuit logic used by the control system of the invention.

By way of introduction to the electrical control 110 and its circuitry, reference is now made to the block diagram of FIG. 3 illustrating the basic logic utilized in control 110. As was stated in the background of the specification, one feature of the electro-hydraulic control 56 is its use of a command signal which is the quotient obtained by "dividing" one system characteristic by another. The block diagram of FIG. 3 illustrates a logic circuit known to those skilled in the art of data manipulation which may be used to approximate a division, without the expense and difficulty of electrically performing a division. The instantaneous pressure command signal is connected by means of a feedback loop to a multiplier X, the other input to which is the pump displacement D. The resulting product of P and D is a torque approximation signal T'. A manually adjustable input torque setting T is compared to the torque approximation signal T' and the difference (or error) is fed to a high gain K (typically an inverting amplifier) which modifies the pressure command signal P in a manner tending to minimize the difference between T and T', i.e., adjust the maximum system pressure to maintain the actual input torque (represented by T') as close as possible to the desired torque setting T. The equations in support of this logic are as follows:

$$P = T/D = K(T-T')$$

$$P = K(T-DP)$$

$$P + KPD = KT$$

$$P(1 = KD) = KT$$

$$P = KT/1+KD$$

or $$P = T/D$$

This is a good approximation if K is much larger than 1; but not quite as good for very small values of D at which point the accuracy is not as important.

Figure 4:
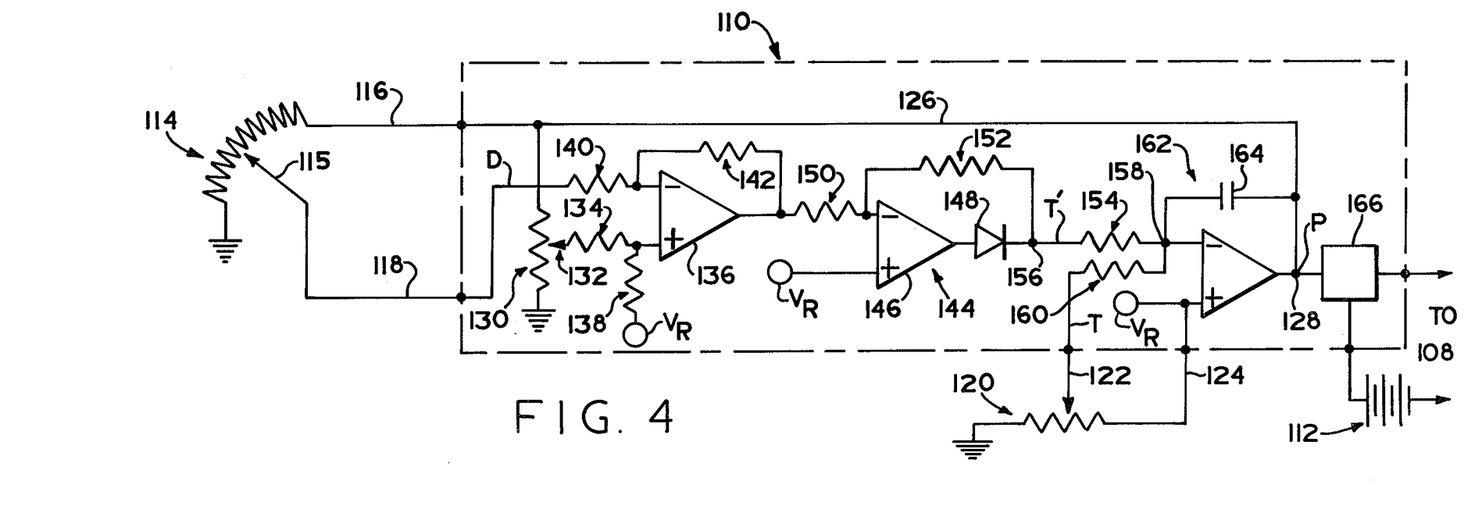
FIG. 4 is a circuit diagram of a preferred circuit implementing the logic of FIG. 3.

Referring now to FIG. 4, there is shown in detail a preferred form of the circuitry within electrical control 110 which may be used to implement the logic illustrated in FIG. 3. The swashplate position potentiometer 114, described in connection with FIG. 1 as providing a pump displacement signal, may preferably perform the function of the multiplier X in FIG. 3 with the lead 116 connected to a lead 126 which transmits the pressure command voltage signal P from a junction 128 through a negative feedback loop and uses it as the excitation voltage for potentiometer 114. The angular position of wiper 115 corresponds to the displacement of swashplate 26. In the subject embodiment, having the wiper 115 positioned in the center of potentiometer 114 corresponds to the swashplate 26 being at neutral and movement of the wiper 115 away from the center position in one direction or another corresponds to displacement of the swashplate 26 in one direction or another.

Also connected to the lead 126, in parallel with the potentiometer 114, is a trimmer potentiometer 130 having a wiper 132 which is connected through a resistance 134 to the noninverting terminal of a differential amplifier 136, the noninverting terminal also being connected through a resistance 138 to a reference voltage $V_R$. The lead 118 connects the wiper 115 through a resistance 140 to the inverting terminal of the amplifier 136, the output of which is connected to the inverting terminal through a feedback resistance 142.

As is generally well known in the art, the trimmer potentiometer 130 may be used for adjustment purposes, i.e., it may be manually positioned such that, when the swashplate 26 is at neutral, the voltages at the wipers 115 and 132 are the same. For purposes of the subsequent description, except where indicated, references to "positive" and "negative" voltages are intended to indicate signals which are, respectively, above and below the reference voltage $V_R$. As the position of swashplate 26 moves from neutral in a direction which causes the wiper 115 to move toward ground, the signal transmitted by lead 118 decreases, resulting in an output from amplifier 136 which is positive and has a magnitude (relative to $V_R$) which is proportional to the product of the signal transmitted by lead 126 and pump displacement. Similarly, if the swashplate 26 moves from neutral in a direction which causes the wiper 115 to move from its centered position away from ground, the signal transmitted by lead 118 increases, resulting in an output from amplifier 136 which is negative but which still has a magnitude proportional to the product of the signal transmitted by lead 126 and pump displacement.

The output from amplifier 136 is conducted to a rectifier circuit, generally designated 144, which includes an amplifier 146 having its output connected to a diode 148. The input to the inverting terminal of amplifier 146 is conducted through a resistance 150 and the inverting terminal of amplifier 146 is connected to the output of the diode 148 through a resistance 152, the output of diode 148 also being connected to a resistance 154. The resistances 150 and 152 are equal and very low relative to the resistance 154 for reasons which will become apparent. When the input to the inverting terminal of amplifier 146 is positive, the output is negative and the diode 148 prevents any current flow. Because the resistance 154 is so large relative to the resistances 150 and 152, the flow of current toward resistance 154 is very small, the voltage drops across resistances 150 and 152 are very small, and the voltage at junction 156 is substantially the positive input voltage to the rectifier 144. Thus, the amplifier 146 is essentially bypassed when the output of amplifier 136 is positive.

When the input to the inverting terminal of amplifier 146 is negative, the output is positive and diode 148 permits an output current flow, but because the resistances 150 and 152 are equal, there is no gain across amplifier 146 and the signal at junction 156 is again positive and of the same magnitude as the input to rectifier 144.

The positive output from the junction 156 (the torque approximation signal T' of FIG. 3) is conducted through the resistance 154 to a summing junction 158, while the signal from the wiper 122 (the input torque setting T of FIG. 3) is conducted through a resistance 160 to the summing junction 158. In the block diagram of FIG. 3, the output from the summing junction is transmitted to the high gain summer K, with the output from the summer (the pressure command signal P in FIG. 3) having a magnitude proportional to the difference between the voltage inputs to the summing junction 158. Therefore, by using the logic of FIG. 3, it would be necessary to maintain a difference between T' and T such that T' would closely approximate T, but there would always be a difference between the actual input torque (T') and the desired maximum input torque (T).

Referring again to FIG. 4, it may be seen that in the preferred embodiment of the invention, an integrator circuit 162 is utilized, instead of the high gain summer K. The integrator circuit 162 includes a capacitor 164 in the feedback loop from the output of the integrator (junction 128) to the summing junction 158. The use of the integrator 162 is advantageous because, under steady-state conditions, there will be a voltage drop across the feedback capacitor 164 with no current flowing through the feedback loop. All of the current flowing through resistance 154 into the summing junction 158 flows out of junction 158 through resistance 160 such that, with resistances 154 and 160 being equal, the voltage drops across resistances 154 and 160 are equal and the two input voltages to the summing junction 158 (corresponding to T' and T) are equal in magnitude, but opposite in polarity relative to $V_R$. Therefore, the pressure command signal P (i.e., the output of integrator 162 at junction 128) is a signal having an absolute voltage value such that when it is fed back over lead 126, the voltage at summing junction 158 is maintained equal to $V_R$, indicating that the signal T' representing actual maximum input torque is equal in magnitude to the signal T representing desired maximum input torque.

Figure 2:
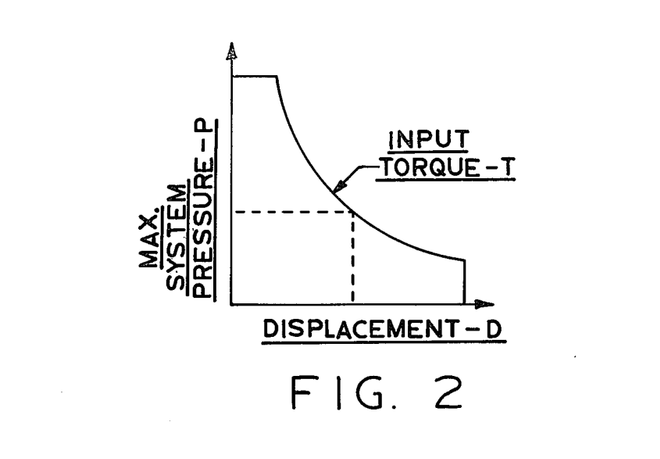
FIG. 2 is a constant torque curve of the type utilized by the control system of the invention.

Referring now to FIG. 2 in conjunction with FIG. 4, it may be seen that the output of the integrator 162, the pressure command signal P, is commanding a maximum system pressure which, for a given pump displacement, will keep the product of maximum system pressure and displacement on the desired constant torque curve. It should be noted that the logic and circuitry of the present invention makes it possible to accomplish this objective without using system pressure as an input to the circuit (thus eliminating the need for a pressure transducer) and without actually reading pump displacement, but only the product of displacement and the pressure command signal.

Referring again to FIG. 4, the pressure command signal P is conducted from the junction 128 to an inverting current amplifier 166, the function of which is to provide an output current which changes in response to changes in the voltage level of signal P. In the subject embodiment, the output current from amplifier 166 is inversely proportional to the varying voltage input, and the changing output current is utilized by the force valve 108 to vary the area of variable orifice 104.

Figure 5:
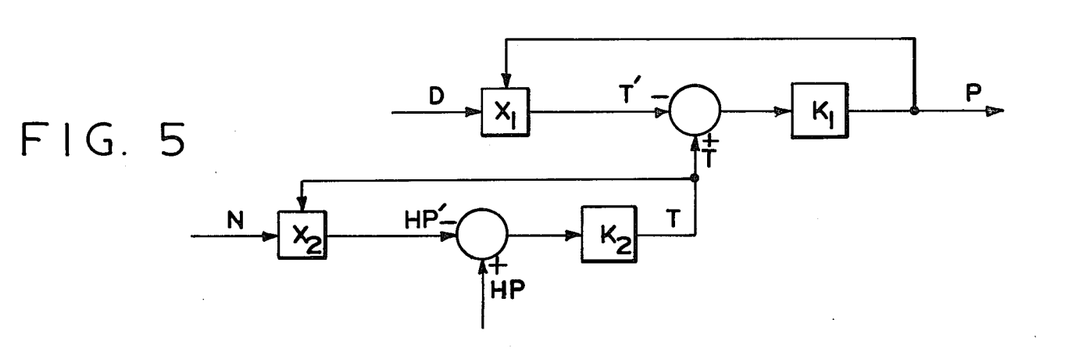
FIG. 5 is a block diagram, similar to FIG. 3, illustrating a two-stage use of the basic invention to perform a different control function.

Referring now to FIG. 5, there is shown an alternative embodiment of the present invention, utilizing the type of logic illustrated in the block diagram of FIG. 3, but in a two-stage arrangement. In many applications, the speed of the prime mover driving the input shaft 18 of the pump 10 is constant, such that the torque limiting control system of FIGS. 1 through 4 is, in effect, a horsepower limiting control system. This is based on the well known relationship (similar to that illustrated by the constant product curve of FIG. 2) that input horsepower HP equals the product of input torque T and input speed N. However, in an application where input speed varies, this factor must be taken into account, and a true horsepower limiting control system may be provided, in accordance with the present invention, using the logic illustrated in the block diagram of FIG. 5.

In FIG. 5, instead of the desired maximum input torque T being a manual setting, it is a generated variable input to the summing junction which sums the torque approximation signal T' and the instantaneous torque command signal T, which is generated by the added logic portion. In the added logic portion, the instantaneous torque command signal T is connected by means of a feedback loop to a multiplier $X_2$, the other input to which is the input speed N. The resulting product of T and N is a horsepower approximation signal HP'. A manually adjustable maximum input horsepower setting HP is compared to the horsepower approximation signal HP' and the difference (or error) is fed to a high gain $K_2$ (typically an inverting amplifier) which modifies the torque command signal T in a manner tending to minimize the difference between HP and HP'. Therefore, as input speed N varies, the torque setting T is varied so that the approximation signal HP' (the product of T and N) approximates the maximum desired input horsepower setting HP. As was the case for the logic in FIG. 3, the approximation is quite good if $K_2$ is much larger than 1, although not quite as good for very small values of input speed N which does not present a practical problem.

Figure 6:
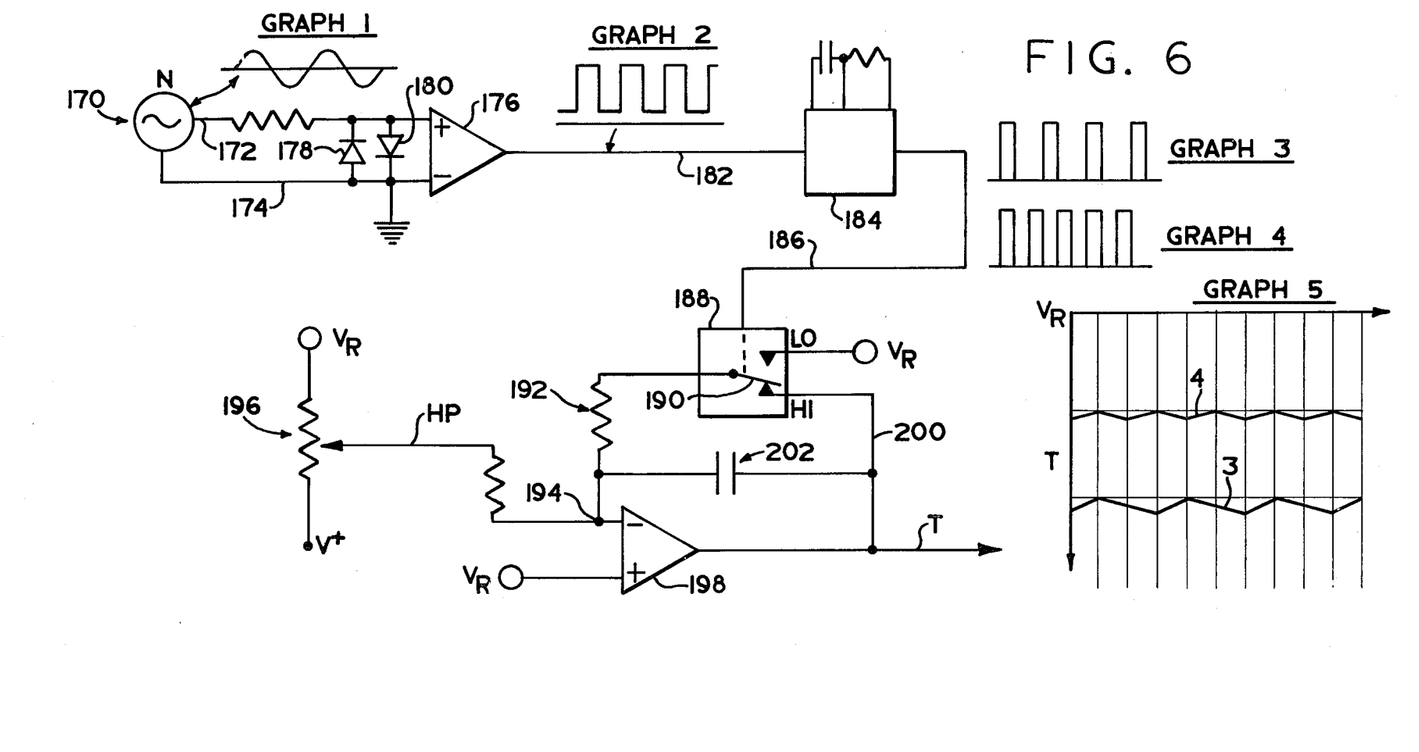
FIG. 6 is a circuit diagram of a preferred circuit implementing the additional logic shown in FIG. 5.

Referring now to FIG. 6, there is shown a circuit diagram of a preferred form of the circuitry which may be used to implement the added logic portion shown in FIG. 5. The input speed of the input shaft 18 is sensed by a speed pickup 170. The output signal generated by the pickup 170 is a sine wave (see GRAPH 1) the frequency of which is proportional to the input speed. The output of the pickup 170 is transmitted over a pair of leads 172 and 174 to the input terminals of a converter 176, the lead 174 being connected to ground. When the sine wave is positive, the converter 176 goes to positive saturation, and when the sine wave becomes negative, the converter goes to negative saturation, thus converting the sine wave to a square wave, the frequency of which is still proportional to the input speed N (see GRAPH 2). Connected in parallel between leads 172 and 174 is a pair of diodes 178 and 180, the characteristics of which are selected to limit the amplitude of the signal (both positive and negative) transmitted to the converter 176.

The square wave output from the converter 176 is transmitted by a lead 182 to the input of a monostable multivibrator 184 (frequently referred to as a "single shot"). The multivibrator 184 produces an output signal which goes to positive saturation (HI) each time a trigger pulse is received, and remains at positive saturation for a predetermined time period before returning to ground (L0), its only stable condition. Accordingly, the output from the multivibrator 184 is a square wave, the important feature of which is the "duty cycle" (i.e., the percentage of time at positive saturation), with the duty cycle being proportional to the input speed. Relatively lower speed results in a signal having a relatively lower duty cycle, as represented by GRAPH 3, while a relatively higher speed will have a signal such as that in GRAPH 4.

The output from the multivibrator 184 is conducted by a lead 186 to an analog switch 188 which includes switching means represented schematically by a movable switching element 190. The analog switch 188 is connected through a resistance 192 to a summing junction 194, which is also connected to a linear potentiometer 196, which is used to manually set the maximum desired input horsepower HP. It will be noted that the horsepower setting HP is always positive relative to a reference voltage $V_R$. The summing junction 194 is connected to the inverting terminal of an integrator circuit 198, which has its noninverting terminal connected to the reference voltage $V_R$. The output of the integrator circuit 198 is the torque command signal T which may then be connected to the resistance 160 of FIG. 4, replacing the linear potentiometer 120.

A lead 200 is connected between the output of the integrator circuit 198 and the "HI" terminal of the analog switch 188, with the integrator circuit 198 including a feedback capacitor 202 connected between the lead 200 and the summing junction 194. The "LO" terminal of the analog switch 188 is connected to the reference voltage $V_R$.

For purposes of the subsequent description of the operation of the analog switch 188 and the integrator circuit 198, it will be assumed that the signal being conducted by the lead 186 is that illustrated by GRAPH 3. The analog switch 188 may be viewed as having two alternating "states" or conditions: when the input conducted over lead 186 is at ground (or negative saturation), the switching element 190 is connected through the LO terminal to the reference voltage $V_R$, and when the input signal is at positive saturation, the switching element 190 is connected through the HI terminal to the feedback lead 200 (as shown in FIG. 6).

When the switch 188 is at LO, the integrator circuit 198 integrates the positive horsepower setting signal HP, resulting in a decreasing torque command signal, as may be seen from the alternately decreasing portions of the curve on GRAPH 5 labelled "3" corresponding to the input speed represented by GRAPH 3. This decreasing torque command signal results in a decreasing potential difference across the capacitor 202. The torque command signal T and potential difference across capacitor 202 continue to decrease until the switch 188 goes to HI. The capacitor 202 then discharges through the parallel circuit containing the lead 200, the switching element 190 and the resistance 192. This discharge causes a decreasing voltage at the summing junction 194 which, after being inverted, results in an increasing torque command signal T as may be seen from the increasing portions of the curve 3 on GRAPH 5. The torque command signal T continues to rise until the switch 188 again goes to LO, at which point the cycle just described begins again. It should be noted in viewing curve 3 of GRAPH 5 that the slopes of the signal T are somewhat exaggerated for clarity of illustration, and preferably, the capacitor 202 should be large enough to minimize the output "ripple" (amplitude) and approximate a DC signal. At the same time, the capacitor 202 must be small enough to be properly responsive to changes in the input frequency. It is believed to be within the ability of one skilled in the art to select an appropriate capacitor 202 in view of the foregoing. In addition, it is believed that those skilled in the art would be able to match the capacitor 202 and resistance 192 to provide an R-C time constant such that, as the input speed N increases (and the duty cycle increases), the torque command signal curve will shift upwardly, (i.e., to have a smaller negative magnitude relative to $V_R$), indicating an appropriately smaller commanded torque which, when multiplied by the higher input speed, will still equal the desired maximum input horsepower HP.

This upward shifting of the torque command signal curve is shown by the curve of GRAPH 5 labelled "4", corresponding to the input speed represented by GRAPH 4. In comparing curves 3 and 4, it should be noted that the slope of the decreasing portions is the same for both, but because the time spent at LO for the input speed of GRAPH 3 is about twice that for the input speed of GRAPH 4, the amplitude of the decreasing portion is also about twice. For either input speed, the time at HI is the same, but the R-C time constant curve for capacitor 202 and resistance 192 is such that, even though the slope changes, the amplitude of the increasing portions for curves 3 and 4 matches the amplitude of the respective decreasing portions.

In the background of the specification, the invention was summarized by reference to first, second and third characteristics X, Y, and Z of the device. The reason for this should now be apparent from the foregoing description of the alternative embodiments of the invention. However, for ease of reference, there is included herein a table indicating, by way of example only, several possible meanings of X, Y, and Z in terms of actual characteristics of the device which are related by the equation $X = Y/Z$.

| Designation | Description | Example (FIGS. 3 & 4) Device Characteristic | Ref. | Example (FIGS. 5 & 6) Device Characteristic | Ref. |
|---|---|---|---|---|---|
| X | variable electrical command signal | variable pressure command signal | P | variable torque command signal | T |
| Y | desired input setting | maximum desired input torque | T | maximum desired input horsepower | HP |
| Y' | setting approximation signal | torque approximation signal | T' | horsepower approximation signal | HP' |
| Z | a third characteristic | pump displacement | D | input speed | N |

It should be apparent that the present invention provides an improved control system for generating a command signal wherein the command signal is obtained mathematically by dividing one system characteristic by another system characteristic, with the command signal being utilized in a feedback loop and multiplied by one of the system characteristics, with the other being the result of a manual input setting.

I claim:

1. A control system for a variable displacement hydraulic device such as a pump or motor having fluid operable means for varying the displacement thereof, and a source of pressurized fluid for operating the fluid operable means, said control system comprising:
   (a) a housing defining a valve bore, an inlet fluid port adapted for series fluid communication with the source of pressurized fluid, a control fluid port adapted for series fluid communication with the fluid operable means, and a drain fluid port adapted for communication with a fluid drain, said ports being in fluid communication with said valve bore;
   (b) valve means disposed in said valve bore and movable between a first position permitting fluid communication between said inlet fluid port and said control fluid port and a second position permitting fluid communication between said control fluid port and said drain fluid port;
   (c) first means for biasing said valve means toward said first position;
   (d) second means for biasing said valve means toward said second position;
   (e) one of said first and second biasing means including:
      (1) means for generating a variable electrical command signal X representative of a first characteristic of said device; and
      (2) means responsive to said variable electrical command signal X to provide a variable biasing force, biasing said valve means toward said respective position, said variable biasing force being related to said variable electrical command signal X in a known manner;
   (f) said means for generating said variable electrical command signal X including
      (1) setting command signal generator means which is variable to correspond to a desired input setting Y representative of a second characteristic of said device;
      (2) means providing a setting approximation signal Y' proportional to the product of a third characteristic Z of the device and the instantaneous variable command signal X, wherein the characteristics X, Y, and Z of the device are related by the equation:

$$X = Y/Z;$$

and
      (3) means for comparing said input setting Y and said setting approximation signal Y' and generating a new command signal X tending to minimize the difference between said input setting Y and said setting approximation signal Y'.

2. A control system as claimed in claim 1 wherein said means providing a variable biasing force comprises a fluid chamber and means responsive to the pressure of fluid in said fluid chamber to bias said valve means.

3. A control system as claimed in claim 2 including a source of pressurized fluid in communication with said fluid chamber and restriction means adapted for series fluid communication between said fluid chamber and a fluid drain.

4. A control system as claimed in claim 3 wherein said restriction means includes means defining a variable orifice and said means providing a variable biasing force includes means responsive to changes in said variable electrical command signal X to vary said variable orifice.

5. A control system as claimed in claim 4 wherein said variable orifice varies between a maximum orifice area and a minimum orifice area as said electrical command signal X varies between a maximum and a minimum.

6. A control system as claimed in claim 1 wherein said variable biasing force varies between a maximum and a minimum as said electrical command signal X varies between a maximum and a minimum.

7. A control system as claimed in claim 6 wherein said means generating said command signal X includes logic utilizing the relationship $X = K(Y-Y')$, wherein K is a constant gain factor.

8. A control system as claimed in claim 6 wherein said means providing a setting approximation signal Y' includes signal generator means having an output representative of said third characteristic Z for a given command signal X, the instantaneous variable command signal X being connected to said signal generator means to provide an excitation signal thereto.

9. A control system as claimed in claim 6 wherein said comparing and generating means includes integrator circuit means to maintain said setting approximation signal Y' substantially equal to said input setting Y.

10. A control system as claimed in claim 1 wherein said first characteristic is maximum system pressure P, said second characteristic is maximum input torque T, and said third characteristic is the displacement D of the device.

11. A control system as claimed in claim 10 including a main flow control valve disposed in series fluid communication between said control fluid port and said fluid operable means.

12. A control system as claimed in claim 11 wherein said means for generating, and said means responsive to, said variable electrical command signal X comprise said second biasing means, and said second biasing means further includes means responsive to system pressure to bias said valve means toward said second position.

13. A control system as claimed in claim 12 wherein said means providing a variable biasing force comprises a fluid chamber and means responsive to the pressure of fluid in said fluid chamber to bias said valve means.

14. A control system as claimed in claim 13 including a source of pressurized fluid in communication with said fluid chamber and restriction means adapted for series fluid communication between said fluid chamber and a fluid drain.

15. A control system as claimed in claim 14 wherein said restriction means includes means defining a variable orifice and said means providing a variable biasing force includes means responsive to changes in said variable electrical command signal X to vary said variable orifice.

16. A control system as claimed in claim 1 wherein said first characteristic is maximum system input torque T, said second characteristic is maximum input horsepower HP, and said third characteristic is the input speed N of an hydraulic pump.

17. A control system for a variable displacement hydraulic device such as a pump or motor having fluid operable means for varying the displacement thereof, and a source of pressurized fluid for operating the fluid operable means, said control system comprising:
 (a) a housing defining a valve bore, an inlet fluid port adapted for series fluid communication with the source of pressurized fluid, a control fluid port adapted for series fluid communication with the fluid operable means, and a drain fluid port adapted for communication with a fluid drain, said ports being in fluid communication with said valve bore;
 (b) valve means disposed in said valve bore and movable between a first position permitting fluid communication between said inlet fluid port and said control fluid port and a second position permitting fluid communication between said control fluid port and said drain fluid port;
 (c) first means for biasing said valve means toward said first position;
 (d) second means for biasing said valve means toward said second position;
 (e) one of said first and second biasing means including
  (1) means for generating a variable electrical pressure command signal P;
  (2) a fluid chamber adapted to communicate with a source of pressurized fluid;
  (3) restriction means adapted for series fluid communication between said fluid chamber and a fluid drain; and
  (4) means responsive to said variable electrical pressure command signal P to vary the amount of fluid restriction provided by said restriction means;
 (f) said means for generating said variable electrical pressure command signal P including
  (1) torque command signal generator means which is variable to correspond to a maximum desired torque setting of the hydraulic device;
  (2) means providing an electrical torque approximation signal representative of the product of the displacement of the pump and the instantaneous pressure command signal; and
  (3) means for comparing said torque command signal and said torque approximation signal and generating a new pressure command signal tending to minimize the difference between said torque command and torque approximation signals.

* * * * *

UNITED STATES PATENT AND TRADEMARK OFFICE
CERTIFICATE OF CORRECTION

PATENT NO. : 4,091,617
DATED : May 30, 1978
INVENTOR(S) : Charles R. Cornell

It is certified that error appears in the above–identified patent and that said Letters Patent are hereby corrected as shown below:

Col. 6, lines 11+18:     $P=T/D=K(T-T)$ should read $P=T'/D=K(T-T')$ $P(1=KD)=KT$ should read $P(1+KD)=KT$ Signed and Sealed this Tenth Day of October 1978

[SEAL]

Attest:

RUTH C. MASON
*Attesting Officer*

DONALD W. BANNER
*Commissioner of Patents and Trademarks*